US012710660B2

(12) United States Patent
Binder et al.

(10) Patent No.: US 12,710,660 B2
(45) Date of Patent: Aug. 18, 2026

(54) AR GLASSES

(71) Applicant: RealWear Switzerland AG, Bern (CH)

(72) Inventors: Timon Binder, Bern (CH); Pascal André Schnell, Bärschwil (CH); Daniel Puerta Diaz, Zürich (CH); Lars Oliver Herrmann, Basel (CH); Maryam Yousefi, Bern (CH); Sebastian Beetschen, Kirchlindach (CH)

(73) Assignee: RealWear SWITZERLAND AG, Bern (CH)

( * ) Notice: Subject to any disclaimer, the term of this patent is extended or adjusted under 35 U.S.C. 154(b) by 0 days.

(21) Appl. No.: 18/715,380

(22) PCT Filed: Dec. 1, 2022

(86) PCT No.: PCT/EP2022/084090
§ 371 (c)(1),
(2) Date: May 31, 2024

(87) PCT Pub. No.: WO2023/099675
PCT Pub. Date: Jun. 8, 2023

(65) Prior Publication Data

US 2025/0147323 A1 May 8, 2025

(30) Foreign Application Priority Data

Dec. 3, 2021 (EP) .................................... 21212197
May 16, 2022 (EP) .................................... 22173439

(51) Int. Cl.
*G02B 27/01* (2006.01)
*G02C 5/22* (2006.01)

(52) U.S. Cl.
CPC ..... *G02B 27/0176* (2013.01); *G02B 27/0172* (2013.01); *G02C 5/22* (2013.01);
(Continued)

(58) Field of Classification Search
CPC ............ G02B 27/0176; G02B 27/0172; G02B 2027/0138; G02B 2027/152;
(Continued)

(56) References Cited

U.S. PATENT DOCUMENTS 9,442,292 B1 9/2016 Gao et al.
9,696,479 B2 7/2017 Hugel et al.
(Continued)

FOREIGN PATENT DOCUMENTS

FR 3092477 A1 8/2020
JP 2014-021390 A 2/2014
WO 2021/211336 A1 10/2021

OTHER PUBLICATIONS

International Search Report for PCT/EP2022/084090 Mar. 16, 2023.
Written Opinion for PCT/EP2022/084090 Mar. 16, 2023.

*Primary Examiner* — Brent D Castiaux
(74) *Attorney, Agent, or Firm* — Sughrue Mion, PLLC

(57) ABSTRACT

AR glasses comprise a frame with a front frame part (1), mounting means (2, 3, 8) and an optical unit (5). The optical unit (5) is held in the front frame part (1), wherein the optical unit (5) forms a module mountable to the eyeglass frame as a single component. The optical unit (5) comprises at least a display source (56), at least one refractive device, such as triplet lens (54), and a beamsplitter (51, 52). These AR glasses are robust, compact and affordable.

31 Claims, 11 Drawing Sheets

(52) U.S. Cl.
CPC ................ *G02B 2027/0138* (2013.01); *G02B 2027/0152* (2013.01); *G02B 2027/0158* (2013.01); *G02B 2027/0178* (2013.01)

(58) Field of Classification Search
CPC ........ G02B 2027/158; G02B 2027/178; G02B 7/008; G02B 2027/0152; G02B 2027/0158; G02B 2027/0178; G02B 2027/0143; G02B 2027/0154; G02C 5/22; G02C 9/04
See application file for complete search history.

(56) References Cited

U.S. PATENT DOCUMENTS 9,897,813 B2 2/2018 Mirza et al.
9,915,823 B1 3/2018 Kress et al.
2004/0212776 A1* 10/2004 Spitzer ..................... G02C 7/08 351/41
2014/0266986 A1* 9/2014 Magyari ............ G02B 27/0176 345/8
2015/0198807 A1* 7/2015 Hirai .................... G02B 27/017 345/8
2016/0103325 A1* 4/2016 Mirza .................... H04N 23/54 351/137
2016/0231572 A1 8/2016 Olsson et al.
2016/0255748 A1* 9/2016 Kim ................... G02B 27/0006 361/695
2017/0108713 A1 4/2017 Blum et al.
2017/0108714 A1* 4/2017 Kuczewski ............ G02C 5/146
2017/0322421 A1* 11/2017 Hunter ............... G02B 27/0176
2019/0271844 A1 9/2019 Kress et al.
2021/0173212 A1 6/2021 Ricks
2021/0199965 A1 7/2021 Hwang et al.
2021/0223575 A1* 7/2021 Lapidot .............. G02B 27/0176
2022/0128823 A1 4/2022 Baudou et al.

* cited by examiner 522
521
523
α
520
51
α
β

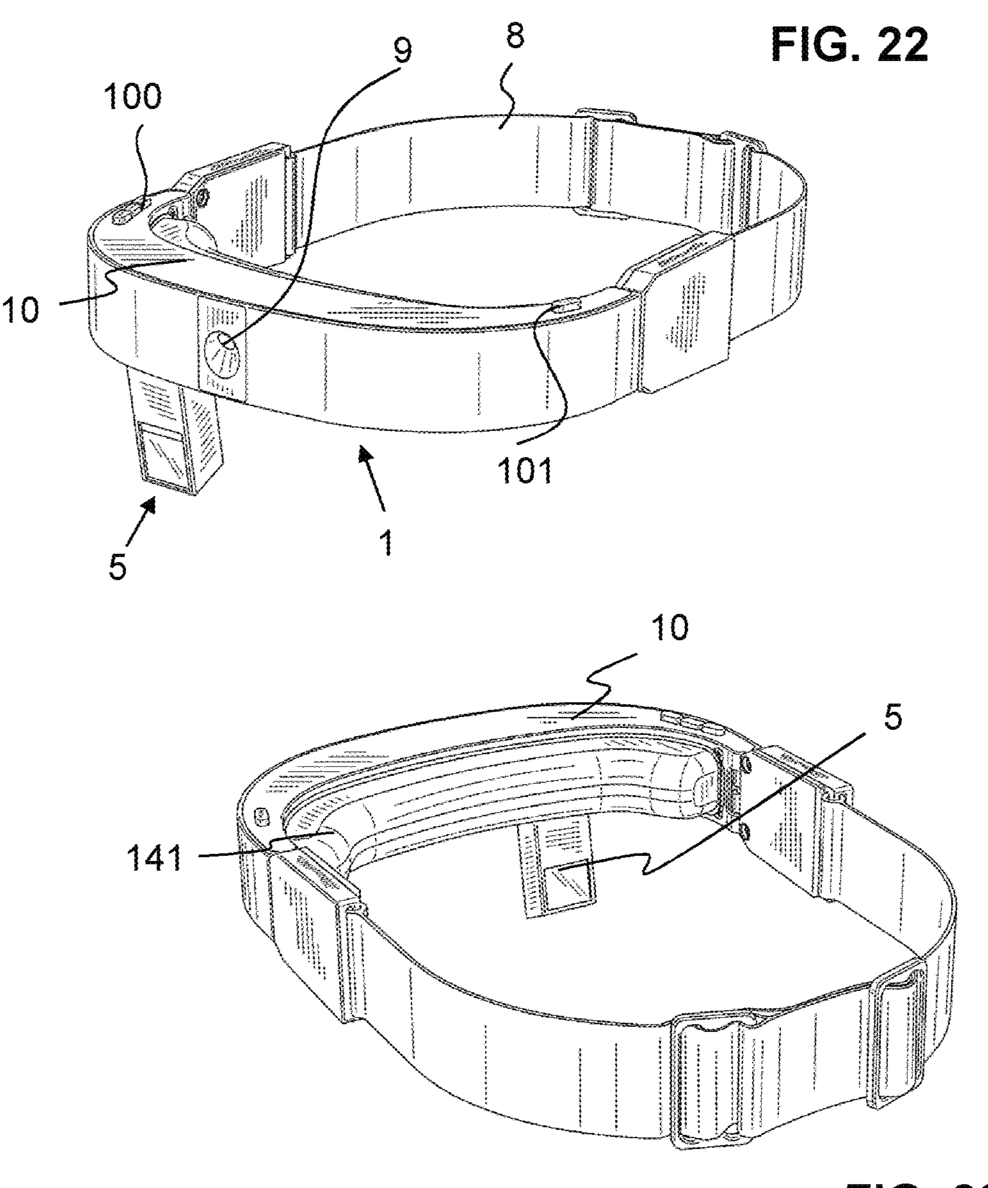
FIG. 22
9
8
100
10
101
5
1
10
5
141
FIG. 23
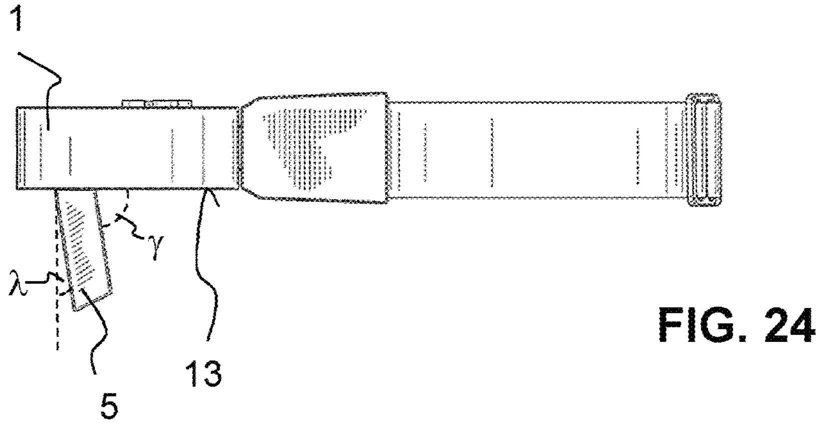
1
γ
λ
5
13
FIG. 24

AR GLASSES

CROSS REFERENCE TO RELATED APPLICATIONS

This application is a National Stage of International Application No. PCT/EP2022/084090 filed Dec. 1, 2022, claiming priority based on European Patent Application Ser. No. 21/212,197.4 filed Dec. 3, 2021 and European Patent Application No. 22173439.5 filed May 16, 2022.

TECHNICAL FIELD

The present invention relates to an Augmented Reality headset, herein called AR glasses.

PRIOR ART

Augmented Reality glasses, also called AR headsets, AR glasses or Smart glasses, enable to overlay, in real time, virtual objects in real-world environments. They enrich an image of the real world with computer generated images and/or digital information. For example, AR glasses can be used for placing AR markers on machines, so that the person wearing the AR glasses knows which areas have to be analyzed or repaired. In addition to maintenance, other fields of application are for example manufacturing, education, retail, travel, real estate and sport.

AR glasses with a heads up display present data to a transparent user's screen in front of their eyes. The user can therefore look at his usual viewpoints. The data displayed on the transparent screen can be maps, locations, information of any kind and even videos or 3D images. AR smart glasses are computer-capable glasses adding additional information to the user's real-world scenes by overlaying computer-generated information on the user's real world. The information can be retrieved from any kind of smart devices, such as computers, smartphones, and tablets. Usually, information is transmitted using Wi-Fi, Bluetooth or GPS.

U.S. Pat. No. 9,442,292 B1 and U.S. Pat. No. 9,915,823 B1 disclose head wearable displays in an eyeglass frame form comprising a camera and a single eye display. The display source and the lens system are arranged on a separate arm fixed to the eyeglass frame. The display source is arranged at a distance to the lens system. In U.S. Pat. No. 9,696,479 B2, the display source is arranged at a distance to the lens system as well.

U.S. Pat. No. 9,897,813 B2 shows AR glasses with a display module including a transparent optical guide, wherein the display module is mounted on a bracket fixed to an eyeglass frame. The bracket is movable relative to the frame. The nose pads holder of the eyeglass frame is moveable relative to the frame as well.

Most of the AR glasses on the market are quite expensive and they have to be handled with care. Only few glasses have enough battery capacity to sustain extended connectivity without being tethered to an additional energy source.

SUMMARY OF THE INVENTION

It is therefore an object of the invention to the invention to provide AR glasses, which are robust, comfortable to wear and cost-efficient.

The inventive AR headset, herein called AR glasses, comprises a frame, also called eyeglass frame, with a front frame part, mounting means an optical unit and a display source. The optical unit is held in the front frame part and it forms a module mountable to the frame as a single component. The optical unit comprises at least a display source, at least one refractive device and a beamsplitter.

The mounting means are preferably either a first eyeglass temple and a second eyeglass temple or they are a band.

The refractive device focuses and/or disperses light beams by means of refraction. It transmits the image shown on the source display by means of the beamsplitter to an imaginary screen in front of the user of the AR glasses.

Preferably, the at least one refractive device is at least one lens. Preferably, the at least one refractive device is a triplet lens.

The AR glasses enable a heads up display.

In a preferred embodiment, the at least one refractive device and the beamsplitter are separate elements arranged within a frame. In other embodiments, the at least one refractive device and the beamsplitter form one single element or component.

In some embodiments, these elements are the only optical elements of the optical unit. In other embodiments, there is a mirror as well but no other additional optical elements. In even other embodiments, there are further additional optical elements. In a preferred embodiment, the at least one refractive device and the mirror are separate elements arranged within a frame. In another embodiment, the at least one refractive element and the mirror form one single element or component.

Preferably, all optical elements of the optical unit are arranged within a common frame. In some embodiments, this main frame is made of an optical material as well. In other embodiments, the common frame, also called main frame, is made of PMMA (polymethyl methacrylate). Preferably, the main frame is made of ABS (acrylitrile-butadiene styrene) which is not an optical material and which is not transparent to light, at least it is not transparent to visible light.

The optical system is less complex than the systems of the state of the art and it is therefore less expensive.

Since it consists of a minimum of elements, the overall weight is kept to a minimum.

Since the optical unit is held in the front frame part, the mounting is stable and no additional mounting parts are needed. In addition, the optical unit is well protected by the eyeglass frame. The eyeglass is well balanced since the optical part is arranged on the front and, in preferred embodiments, the optical unit can just protrude downward from the front frame part. The eyeglass is therefore well balanced. The inventive AR glasses are easier to wear than AR glasses with sideway mounted brackets extending to the front of the frame. They are comfortable even when used for a long time. This especially enables this AR glasses for use in work environments.

Since the optical unit is mountable as one single component, assembly of the AR glasses is simplified and therefore less expensive and affordable for everyone. The optical elements do not have to be assembled within the eyeglass frame but can be assembled to the single component before assembly. This also increases the quality and minimizes defective goods.

Since the module formed by the optical unit comprises the display source as well, the image quality is improved. No vibrations or other disturbances can diminish the image quality between display source and beamsplitter output.

The optical system can be arranged to a classic looking eyeglass frame. However, it can also be specially designed. Preferably, the eyeglass frame looks like a bended bar with a front frame part in the shape of a slightly bended rectangular broad band and temples with thickened ends. The ends preferably have a mainly cuboid shape.

The band can be fixed to the front frame part or power sources, such as batteries can be arranged between the front frame part and the band. The arrangement of the power sources can be such that the AR glasses are well balances when in use.

In other embodiments, temples are present. The temples are preferably tapered between the thickened ends and the front ends of the temples in order to be arranged over the user's ears. In preferred embodiments, batteries or a similar type of power source are arranged within the thickened ends of the temples. The weight behind the user's ears is a comfortable compensation of the weight of the optical unit at the front part of the eyeglass frame.

The AR glasses are therefore comfortable to wear. In addition, the batteries or power source enable a whole day use of the AR glasses without recharging. This enables the AR glasses to be used by artisans or technicians.

The batteries or power sources can also be arranged in the front frame part.

In some embodiments, the batteries have a custom-made shape. This enables to optimize the shape of the temples so that the eyeglasses are very comfortable to wear. Especially, the batteries can extend along a significant length of the temples so that the rear free ends of the temples can be shaped quite small and can be chosen according to the size of the user's head. The batteries can have a custom-made shape as well when they are used with a band or when they are located in the front frame part.

Preferably, the inventive AR glasses have a single-eye display. This means that the optical unit is placed in front of one eye of the user only. The other eye of the user looks directly into the real world. The single eye display has the advantage that the user's brain adapts to the system more easily.

The inventive AR glasses can be used without additional spectacle lenses. In other embodiments spectacle lenses can be fixed to the spectacle frame as well. This allows the combination of the AR functions with prescription glasses and/or with protection glasses.

In case lenses are used, the optical unit is arranged between the face of the user and the spectacle lenses or the optical unit is arranged in front of the spectacle lenses, i.e. on the opposite side of the face. The arrangement in front of the spectacle lenses is preferred, since the correction of the prescription glass is applied to the virtual image as well and operation is safer if the protection glass is arranged between the optical unit and the eye.

In preferred embodiments, the optical unit comprises a main frame. Preferably, at least one, preferably all, of the following optical elements is/are attached to or is/are arranged within the frame: the display source, the at least one refractive device and the beamsplitter.

Preferably, the at least one refractive device, especially the triplet lens, is arranged within the main frame. Preferably, the display source and/or the mirror is/are attached to the main frame. Preferably, they are glued to the main frame. Like this, a single component is quite easily assembled and can be mounted to the eyeglass frame without having to adjust and align the optical elements within the frame. High quality beam guidance is therefore guaranteed.

In preferred embodiments, the main frame is formed by a closed hollow body with at least one opening closed by the display source. In some embodiments, the hollow body comprises additional openings. For example, at least one cover may close an opening leading to the at least one refractive device, usually the triplet lens, and, if present, the mirror may close another opening. This protects the optical elements, i.e. the at least one refractive device, usually the triplet lens, the mirror, the screen of the display source and the beamsplitter from contamination from the outside. This is especially important when the AR glasses are used in a workspace environment.

Preferably, the main frame is made of plastic, especially of poly(methyl methacrylate, called PMMA, COP (cyclo olefin polymer) or COC (cyclic olefin copolymer). Plastic has less weight than glass. These plastics are materials used in optics with desirable high optical features, such as low dispersion, high surface hardness, homogeneous refractive index and low inclusion of defects. The weight of the optical unit is therefore reduced.

In preferred embodiments, the main frame comprises a bottom end, wherein an end piece is attached to this bottom end, the end piece or the end piece together with the bottom end forming a beam splitter. This allows integrating the beamsplitter as well in order to form the single component optical unit, which enhances the image quality as well. In some embodiments, the bottom end is inclined. In other embodiments, the bottom end extends perpendicular to a longitudinal axis of the main frame.

Preferably, the end piece is made of poly(methyl methacrylate, called PMMA or any other suitable light material as well, such as COP (cyclo olefin polymer) or COC (cyclic olefin copolymer). This reduces the weight of the optical unit and therefore of the AR glasses as well.

In some embodiments, the end piece is made of an optical glass or an optical material.

In some embodiments, the end piece comprises a lower part and an upper part which are separate components fixed to each other. The beam splitter coating is preferably arranged in a region between the lower part and the upper part.

Preferably, the end piece comprises none-polished side walls. This avoids unwanted reflections toward the user's eye.

The at least one refractive device, especially the triplet lens, is made of any suitable material. Preferably, it is made of glass or of a combination of different types of glass in order to improve the image quality. It can also consist of another suitable material or combinations of such materials. It can also consist of a combination of glass and plastic materials.

The optical unit can be held stationary within the eyeglass frame. In preferred embodiments however, the optical unit is movable held within the front frame part, wherein the optical unit is slidable and/or rotatable relative to the front frame part. Preferably, the optical unit is both, slidable and rotatable. This enables to adjust the optical unit to the user's eye and to optimize the AR function. Since the display source and the mirror are fixed into the same frame as the at least one refractive device, usually the triplet lens, and the beamsplitter, it does not matter in which position the optical unit is moved. The quality of the image shown to the user is always the same.

In preferred embodiments, the eyeglass frame comprises a nose pad unit, wherein the nose pad unit is movable relative to the front frame part in order to adjust the position of the eyeglass frame on a nose of a user. Preferably, the inventive AR glasses comprise both, the adjustment of the optical unit and the adjustment of the nose pad unit. In other embodiments, for example in some embodiments comprising a band to be the mounting means, the nose pad unit is not moveable.

In preferred embodiments, the AR glasses comprise an electronic unit, which is arranged within the front frame part of the eyeglass frame. This gives more freedom in designing the temples and the overall shape of the eyeglass frame. In addition, it reduces complexity of wiring, especially when front facing sensors are used as well. It also balances the weight on the batteries when they are arranged on the rear side of the temples, i.e. at the free ends of the temples.

Preferably, the front frame part comprises a cooling element arranged in the region of the electronic unit. The front frame part is preferably directed away of the user. This allows cooling the electronic unit, which enhances performance, prolongs lifetime and protects the user's skin from burns as well. The cooling element can be a cover made of metal, or any other thermal conducting material. The cooling element may comprise ribs to enlarge the heat-radiating surface.

The minimized optical unit allows producing quite small AR glasses. In preferred embodiments, the temples are movable relative to the front frame part so that the eyeglass frame is foldable. This enables to store the AR glasses when not in use within a quite small box or even in a pocket of a jacket.

The optical unit is realized in the shape of a quite stable block. Furthermore, it is well held within the eyeglass frame and only a part of the optical unit extends from the eyeglass frame. Therefore, the inventive AR glasses are quite robust and is suitable to be used by artisans and technicians.

In preferred embodiments, the eyeglass frame comprises two hinges being arranged one above the other and connecting the first or second eyeglass temple with the front frame part, thereby forming a gap between each other. A flexprint is arranged within the eyeglass frame leading from the first eyeglass temple or from the second eyeglass temple to the front frame part, wherein the flexprint is arranged in the gap between the two hinges leaving the hinges free. The flexprint, which is the electronic connection between the different electronic parts or batteries within the AR glasses, has enough space when the temples are folded and it is not overstretched by the hinges. On the other hand, the hinges are not hindered in their movement when the temples are folded.

The combination of a display source, at least one refractive device and a beamsplitter in a single module or component to form an optical unit used in an AR device is claimed herein as a separate invention as well. This means that this inventive optical unit can be used in other AR devices and not only in AR glasses. In preferred embodiments, this optical unit comprises the features as mentioned in this description and the claims and shown in the figures. Especially, some embodiments of the optical unit comprise a triplet lens and/or a frame and/or a mirror.

In preferred embodiments, a padding is arranged on a rear side of the main front part facing the user's forehead. This improves the fix and the comfort to wear and it also isolates toward the user's forehead. The padding is preferably used in embodiments having a band. It can also be used in embodiments having temples.

Further embodiments of the invention are laid down in the dependent claims.

BRIEF DESCRIPTION OF THE DRAWINGS

Preferred embodiments of the invention are described in the following with reference to the drawings, which are for illustrating the present preferred embodiments of the invention and not for limiting the same. In the drawings.

FIG. 22 shows a perspective view of AR glasses in another embodiment according to the invention;

FIG. 23 shows the AR glasses according to FIG. 22 in a perspective view from the rear and FIG. 24 shows a side view of the AR glasses according to FIG. 22.

DESCRIPTION OF PREFERRED EMBODIMENTS

Figure 1:
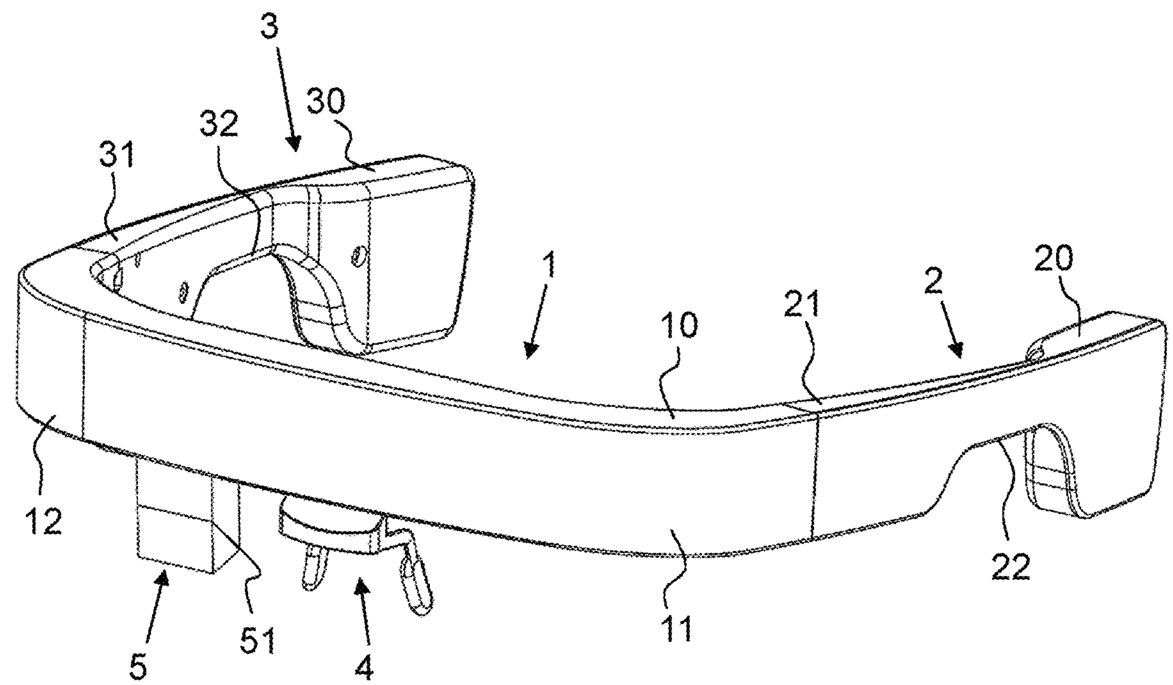
FIG. 1 shows a first perspective view of AR glasses in a first embodiment according to the invention.

As shown in the embodiment according to FIG. 1, the inventive AR glasses comprise an frame, herein called eyeglass frame. The eyeglass frame has a front frame part 1 and a first and second eyeglass temple 2, 3. The AR glasses can therefore be carried on a user's head like normal spectacles, such as sunglasses, wherein the eyeglass temples 2, 3 extend behind the ears of the user.

The eyeglass frame can have any appropriate shape. Preferably, the front frame part 1 is shaped like a bended beam having a U-shape with a top 10, a bottom 13, a front consisting of a main front 11 and a side front 12, and a rear 14.

Preferably, the top 10 and the bottom 13 are flat. This means they do not comprise any indentions or elevations or at least not any prominent indentions or elevations. The top 10 and the bottom 13 extend preferably forward at a small angle such that the distance between the top 10 and the bottom 13 is less towards the main front 11.

The top 10, the bottom 13 and the rear 14 are preferably made of one piece. However, the can also be assembled from separate pieces. They define an interior, which holds some electronic parts as well as at least one camera, preferably at least one additional sensor and optionally actuators. The at least one sensor is for example to measure geometry of the surrounding environment (time of flight sensors, cameras sensitive to UV, visible and infrared range, lidar, radar, ultrasound), position and movement of the user (IMUs, geolocation sensors), environmental properties (temperature, pressure, humidity, gas sensors). Actuators are for example light sources to enable image acquisition in dark environments or stepper motors to adjust parts of the optical system. The electronic parts and the camera are not shown in the figures. The top 10, the bottom 13 and the rear part are preferably made of plastic or any other suitable material for eyeglass frame.

Figure 2:
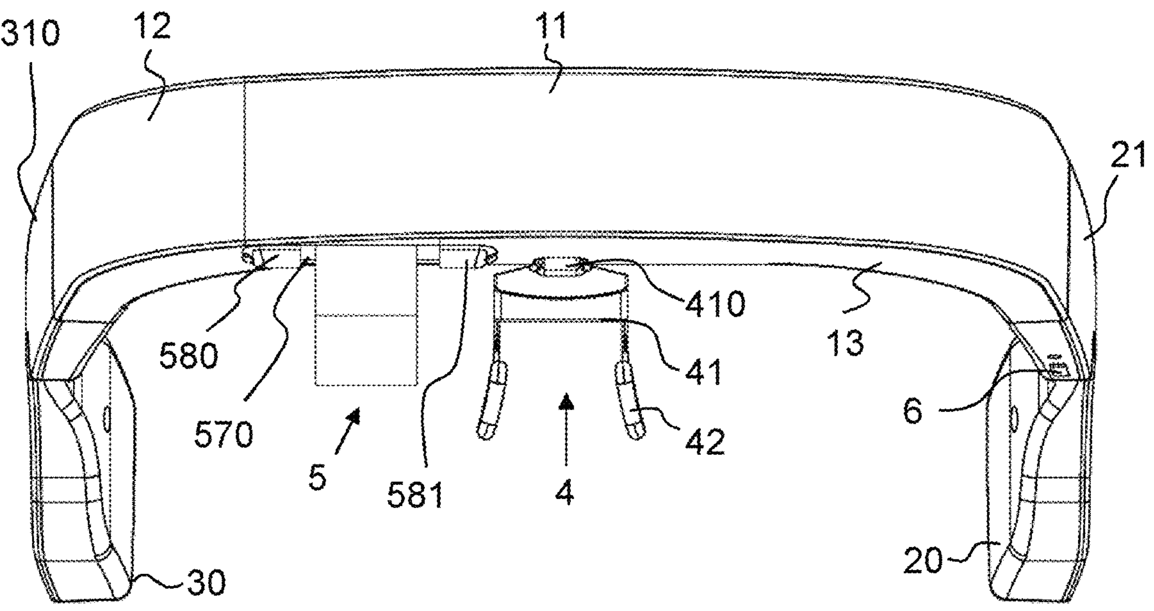
FIG. 2 shows a second perspective view of the AR glasses according to FIG. 1.

As can be seen in FIG. 2, the bottom 13 of the front frame part 1 comprises at least to windows. In the first window located in the middle of the front frame part 1 a nose pad unit is hold. On one side of this first window, a second window is present. An optical unit 5 extends downwards from the interior of the front frame part 1 and through this second window. The second window is closed with a first protection 580 and a second protection 581, arranged on both sides of the optical unit 5, thereby protection the interior of the front frame part 1 and the optical unit 5 against water entering into the AR glasses.

The main front 11 is preferably a cover. Preferably, the cover can be removed, giving access to the interior within this region of the eyeglass frame. In this region, an electronic unit of the AR glasses is arranged and fixed to the inside of the front frame part 1. Preferably, the electronic unit is arranged on the other side of the nose pad unit 4 than the optical unit 5. The electronic unit is preferably arranged on a PCB (printed circuit board) completely arranged in the main front 11. The electronic unit is preferably capable of connecting with an external smart device, such as a computer, a tablet or a smart phone.

The main front 11 is preferably made of a material, which cools the electronic unit.

Preferably, the main front 11 radiates the heat. For example, it is made of metal. In this embodiment, the main front 11 is flat. However, it can also comprise cooling ribs or cooling fins enhancing the cooling effect.

On the side of the optical unit 5, the main front 11 is followed by the side front 12. Preferably, the side front 12 aligns with its surfaces with the main front 11, so that smooth transitions are provided. The side front 12 covers the camera, which is arranged in in the same region of the interior of the front frame part 1. The side front 12 is therefore made of a transparent material, such as PMMA or PC (polycarbonate). It is therefore a window. Preferably, the window is a one-way mirror, so that the camera cannot be seen from the outside.

The first and the second eyeglass temple 2, 3 preferably align with the surfaces of the front frame part 1. Preferably, the shape of the first and the second eyeglass temple 2, 3 is identical or at least similar. Both of them comprise a thickened end 20, 30. In these thickened ends, a battery or any other suitable type of power source is arranged. The battery is not shown in the figures. In case only one of the temples 2, 3 comprise a battery, then the other temple 2, 3 is filled with a material having the same or at least a similar weight. This equilibrates the AR glasses on the user's nose and they are comfortable to wear. The batteries are preferably chargeable by inductive charging. In other embodiments, ports are present to charge them through a wire. Preferably, the battery is a LiPo (lithium polymer) battery.

The eyeglass temple 2, 3 can be straight bars or beams as well. In the embodiment shown in these figures, they each comprise a temple arm 21, 31 extending in alignment from both ends of the front frame part 1, followed by a thinned portion forming an arch 22, 32 and then followed by the thickened ends 20, 30. The arches 22, 32 are place over and around the ears of a user.

A port 6 for a USB connector or a similar connector is preferably present in the eyeglass frame. It can be arranged in the front frame part 1. In this embodiment however, it is arranged in the first temple 2, near the front frame part 1, and more precisely near the electronic unit.

A touch panel 310 can be arranged on the outside of the second eyeglass temple 3, preferably flush with the outer surface of the second eyeglass temple 3. The touch panel is used to control the AR glasses by using predefined hand gestures. Preferably, it is arranged near the electronic unit and either connected directly to it or onto a flexible backbone that is then connected to the electronic unit.

Figure 3:
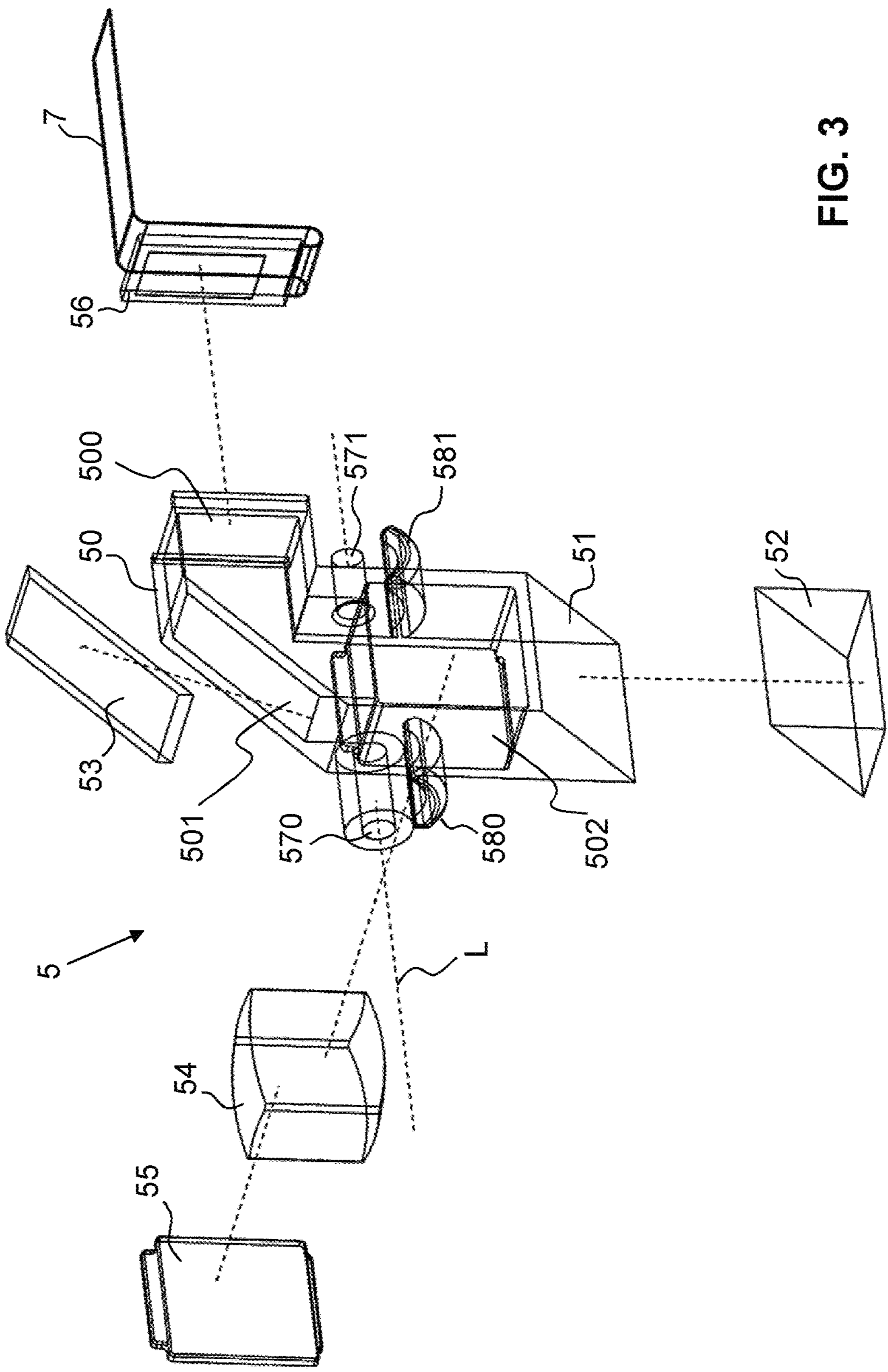
FIG. 3 shows an exploded perspective view of an optical unit of the AR glasses according to FIG. 1.

FIG. 3 shows the optical unit 5. It comprises a main frame 50 made of one piece. It is preferably made of PMMA (poly(methyl methacrylate). Alternative materials are COP (cyclo olefin polymer) or COC (cyclic olefin copolymer). The main frame 50 is a housing with a hollow interior and several openings leading to this interior. The main frame 50 is preferably manufactured by injection moulding.

The main frame 50 has the outer shape of geometric bodies combined with each other and comprising a common hollow interior. The main body 50 consists of a large first cuboid with a first triangular prism on one side, a second triangular prism on the other side and a small second cuboid arranged at one vertical side of the second prism and offset above the first cuboid. The inclined or oblique surface of the second prism is rotated 90° to the inclined or oblique surface of the first prism. The second cuboid and the first cuboid form a step. "Vertical" and "above" means the direction when worn by an upright user.

The second cuboid comprises a rectangular first opening 500 leading into the housing. The display source 56 connected to the flexprint 7 is closing this opening. The display source can be fixedly attached to the main frame 50 in any suitable way, thereby closing the first opening 500. Preferably, the display source 56 is glued to the main frame 50. The display source 56 is preferably a microdisplay unit of OLED's (organic light emitting diode).

On the opposite side of this first opening 500, the main frame 50 comprises a second opening 501, which is preferably rectangular as well. This second opening 501 is arranged in the inclined wall of the second prism.

This second opening 501 is closed by a mirror 53. Preferably, it is a plane, flat mirror 53. The mirror 53 is preferably glued to the main frame 50. The mirror 53 is arranged at an angle of 450 with regard to the surface of the display source 56.

A third opening 502 in the first cuboid of the main frame 50 is directed to the user's eye. It leads to a cuboid space within the main frame 50. A least one refractive device, here a triplet lens 54, is entered into this space by this third opening 502. The triplet lens 54 preferably consist of glass or different glasses or of another suitable material or combinations of such materials. It can also consist of a combination of glass and plastic materials. The triplet lens 54 is fixed into the space of the main frame 50 by gluing. Triplet lenses are a compound of three single lenses. The triplet lens 54 used in the inventive AR glasses preferably comprise a central piece with low refractive index cemented to two pieces with high refractive index on either side. The central piece is preferably made of crown glass and the two pieces are preferably made of flint glass. The lens surfaces are preferably either spherical or aspherical surfaces and designed to reduce optical aberrations.

The third opening 502 is securely closed afterwards by with a cover 55. The cover is preferably made of PMMA as well. Preferably, it is transparent as well. The cover 55 ensures that the space, which comprises the triplet lens 54, remains dust free. The wall opposite to the third window 502 is closed.

A first curved side of the triplet lens 54 is directed to the top. A second curved side of the triplet lens 54 is directed to the first prism, actually to the inclined wall of the first prism.

Please note that there is no wall between the first cuboid and the first prism.

The inclined side or wall of the first prism is preferably provided with a beam splitter coating 51. This inclined side with the beam splitter coating 51 is arranged at an angle of 450 compared to the straight sides of the triplet lens 54 and of the side wall of the first cuboid of the main frame 50.

An end piece 52 is attached to this inclined side, which forms the lower end of the optical unit 5. The end piece 52 has the shape of a triangular prism as well. The end piece 52 together with this end of the main frame has the form of a cuboid. The end piece 52 is preferably made of a material which has a refractive index matching to the material of the main frame 50 and which has similar dispersive properties. Preferably it is made of PMMA. Preferably, it is glued to the main body 50. The end piece 52 completes the beamsplitter.

The light beam eradiated form the display source 56 enters the optical unit 5. It is reflected by the mirror 53. It then enters the triplet lens 54 and it leaves the triplet lens 54 at the curved bottom side to reach the bottom of the main frame 50. There, it reaches the beamsplitter defined by the angled interface between the lower surface main frame 50 comprising the beam splitter coating 51 and the upper surface of the end piece 52. The beam splitter directs first part of the light beam originally eradiated from the display source to the user's eye, where the brain of the user superimposes the image shown by the display source 56 to the real-life image he sees at a distance in front of him. A second part of the light beam passes through the beamsplitter to the bottom of the end piece 52 and leaves the optical unit 5 unused. The beamsplitter coating 51 is in a typical setting chosen such that the first part is between 30-60% or about 70% of the total light incident on coating 51. The reflection/transmission ratio of the beamsplitter may be adjusted based on the brightness of the display source 56 and the ambient lightning conditions to provide a balanced AR image. In case of polarized emission from the display source 56, a polarizing beamsplitter may be used to direct nearly 100% of the emitted light to the user's eye.

The main frame 50 comprises in the upper region of the triplet lens 54, preferably in the upper region of the first cuboid a first guiding tube 570 and a second guiding tube 571, which can be a shaft as well. The second guiding tube 571 actually supports the optical unit within the front frame part 1. They are arranged on opposite sides of the main frame 50, preferably on opposite sides of the first cuboid. Preferably, they are arranged in a line with an identical central axis L. This central axis L extends perpendicular to the surface of the display source 56. The first and the second guiding tubes 570, 571 protrudes from the sidewalls of the main frame 50. They do not pass through the wall of the main frame 50. Preferably, the openings of the tubes 570, 571 do not lead into the interior of the main frame 50. The tubes 570, 571 are either made in one piece with the main frame 50 or they are fixedly attached to the main frame 50, for example, they are glued to it.

Below the two tubes 570, 571, a first protection 580 and a second protection 581 against water or any other pollutions are provided. In these embodiments, they are basins facing the guiding tubes 570, 571.

Figure 4:
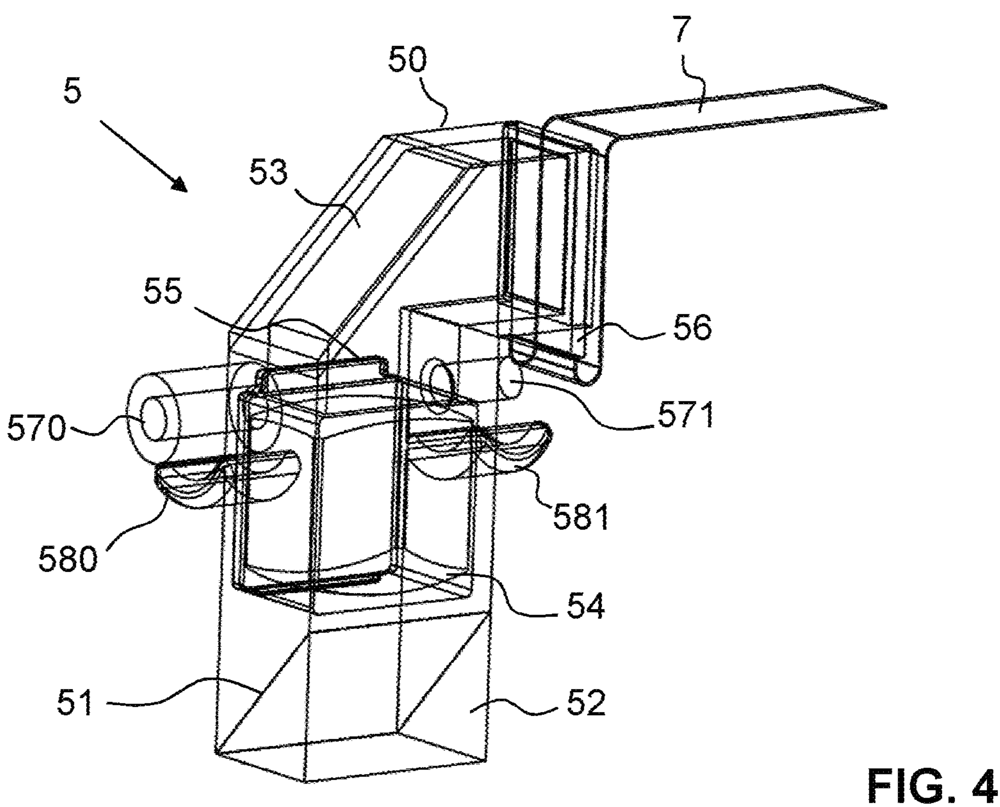
FIG. 4 shows the optical unit according to FIG. 3 in an assembled state.
Figure 5:
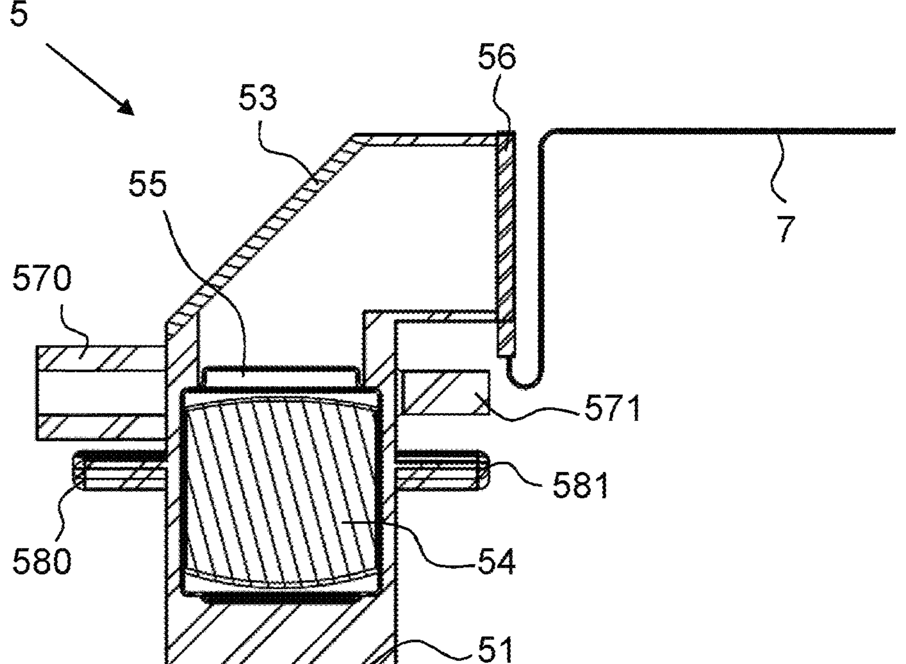
FIG. 5 shows a longitudinal section of the assembled optical unit according to FIG. 4.

FIGS. 4 and 5 show the assembled optical unit 5 as described above. It forms a module, i.e. an independent single component, which can be handled as a whole. Especially it can be mounted as an independent single component to the eyeglass frame. It can also be moved relative to the eyeglass frame during use.

The optical unit 5 is not only held within the main front 11 of the front frame part 1, but it can also be moved and adjusted relative to the main front 11 and the front frame part 1. This can be seen in FIGS. 6 to 9.

Figure 6:
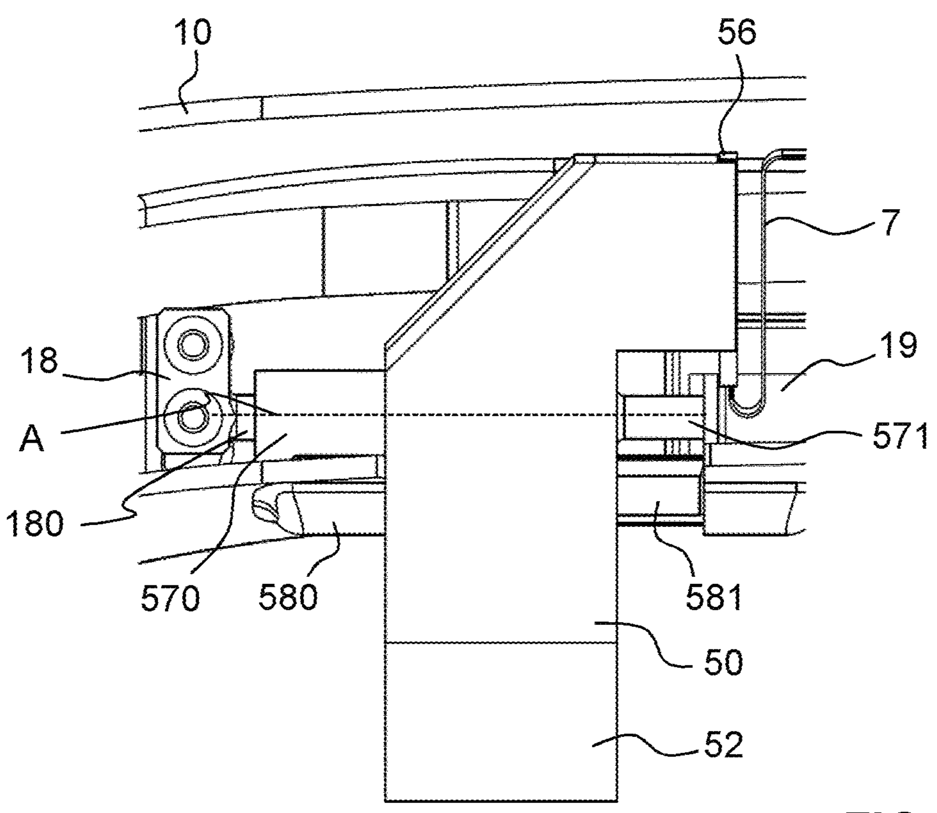
FIG. 6 shows a front view of the assembled optical unit mounted in a frame of the AR glasses according to FIG. 1, the optical unit being in a first sliding position and the frame being shown without a closing cover.
Figure 7:
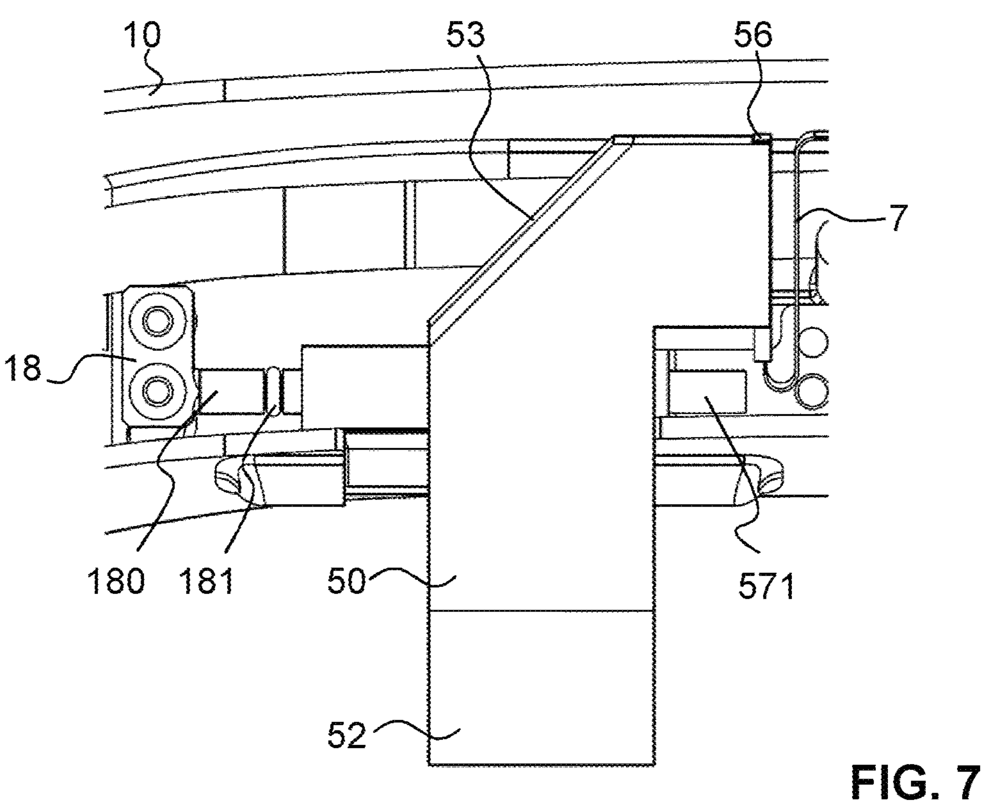
FIG. 7 shows the assembled optical unit mounted in the frame according to FIG. 6, the optical unit being in a second sliding position.

FIGS. 6 and 7 show the optical unit 5 arranged within the front frame part 1. A shaft 180, which is fixed to a holder 18 of the front frame part 1, is protruding into the first guiding tube 570. The second guiding tube 571, which can also be a shaft, protrudes into a duct 19 of the front frame part 1. An O-Ring 181 is mounted in an annular groove around the shaft 180. In FIG. 7, the O-ring 181 is visible. This is just for explanation reasons. Usually, the O-ring 181 is always within the guiding tube 570.

The optical unit 5 is movable along a sliding axis A defined by the longitudinal axis of the two guiding tubes 570, 571, wherein the shaft 180 moves relative to the first guiding tube and the second guiding tube 571 moves relative to the duct 19. The optical unit 5 moves in horizontal direction, i.e. perpendicular to the surface of the display source 56. It is a translatory movement.

The O-ring 181 acts as a stopper on one side and the face of the duct 19 acts as a stopper on the other side FIG. 6 shows the maximum translation of the optical unit 5 to the left hand side, where the O-ring 181 abuts on the main frame 50 of the optical unit 5. FIG. 7 shows the maximum translation of the optical unit 5 to the right hand side, where the second guiding tube 572 has entered the duct 19. The duct 19 is not shown in FIG. 7, but ca be seen in FIG. 6.

The holder 18 and the duct 19 are preferably made of metal.

The movement can be made by hand, by simply touching the optical unit 5. In other embodiments, a slide or another suitable element is present so that the optical unit 5 does not have to be touched. In another embodiment, a motor is present in the front frame part moving the optical unit 5 along the sliding axis A. The motor can be activated by the touch panel 310 mentioned before.

Preferably, the optical unit 5 is fixed in its position by friction.

Figure 8:
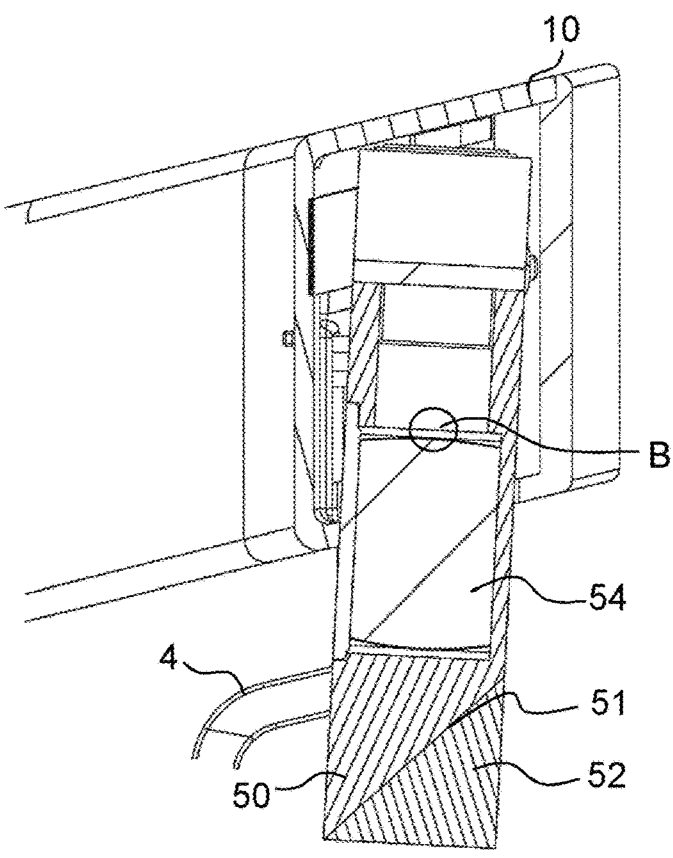
FIG. 8 shows a longitudinal section of the assembled optical unit mounted in the frame according to FIG. 6, the optical unit being in a first tilt position.
Figure 9:
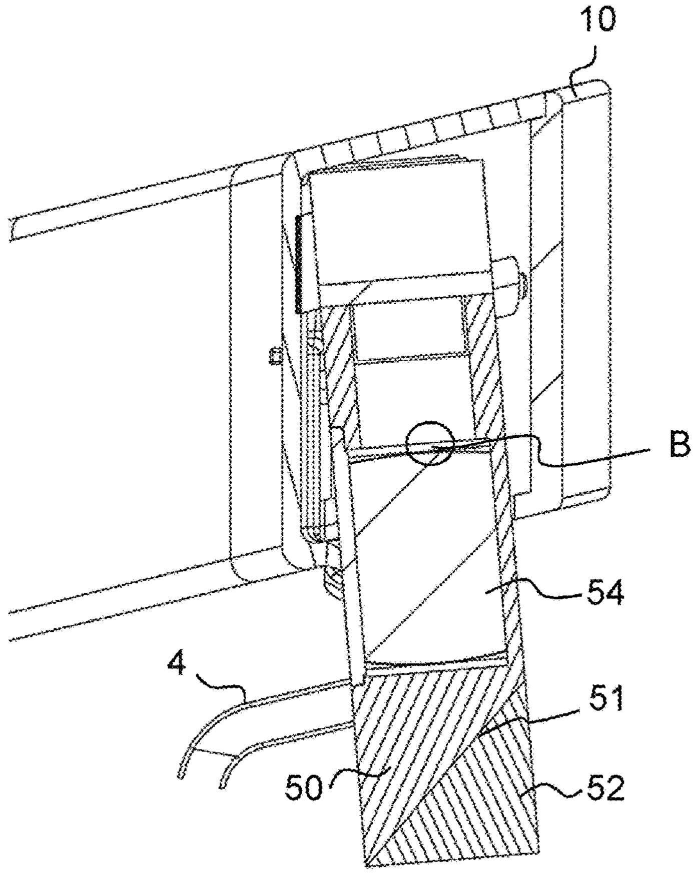
FIG. 9 shows the assembled optical unit mounted in the frame according to FIG. 8, the optical unit being in a second tilt position.
Figure 10:
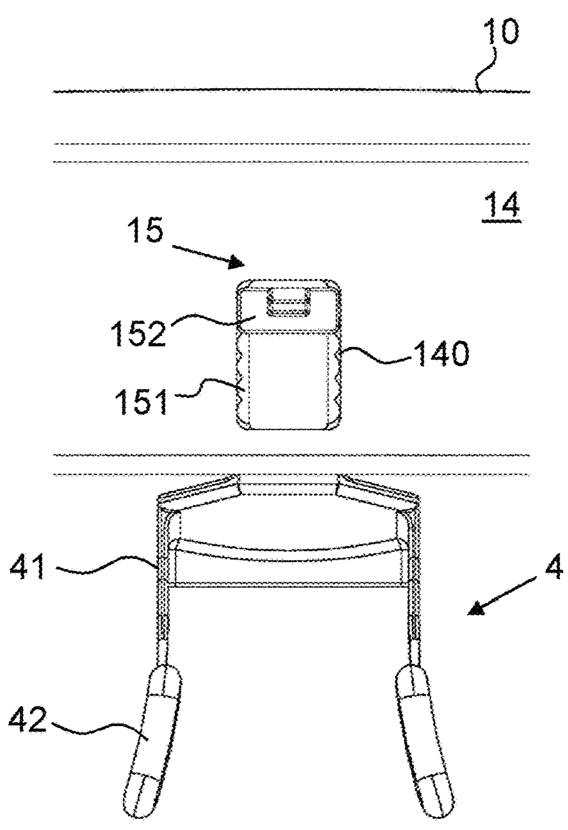
FIG. 10 shows a rear side of the front frame with an adjustment unit and the nose pad unit of FIG. 1 in a first position.
Figure 11:
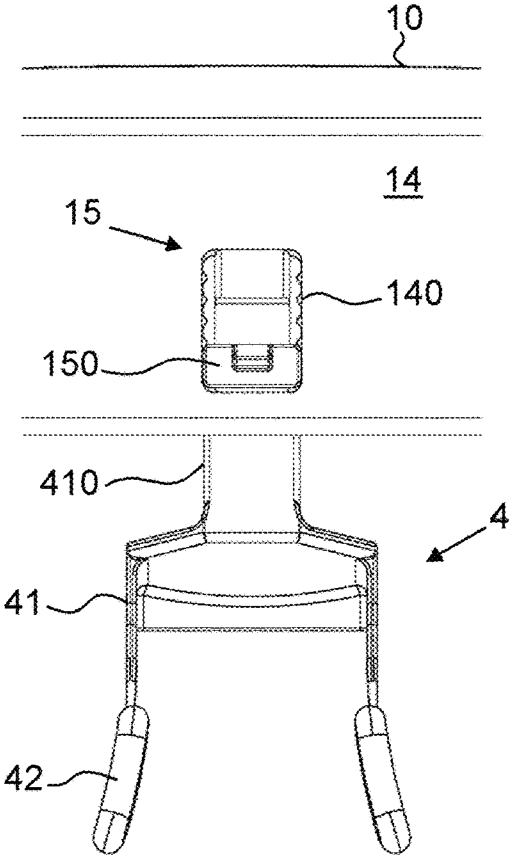
FIG. 11 shows the rear side of the front frame with the adjustment unit and the nose pad unit of FIG. 10 in a second position.

Alternatively or in addition, the optical unit 5 can be rotated as well. This is shown in FIGS. 8 and 9. The rotation axis is marked with the reference sign B. The position is preferably fixed by friction.

FIG. 8 shows the optical unit 5 in a position in which it is rotated maximally in clockwise direction and FIG. 9 shows the maximum rotation position in counterclockwise direction.

The nose pad unit 4 can be moved relative to the front frame part 1 as well. A setting or adjustment unit 15 is arranged within the interior of the front frame part 1 comprising to parallel racks 151 and a slide 152. The slide 152 protrudes a window 140 arranged in the rear 14 of the front frame part 1.

The slide 152 is connected with adjustment legs 410 connected to the nose bride 41 of the nose pad unit 4. The nose bridge 41 holds the nose pads 42. The racks 151 enable moving the nose pad unit 4 and to fix it in discrete positions.

Figure 12:
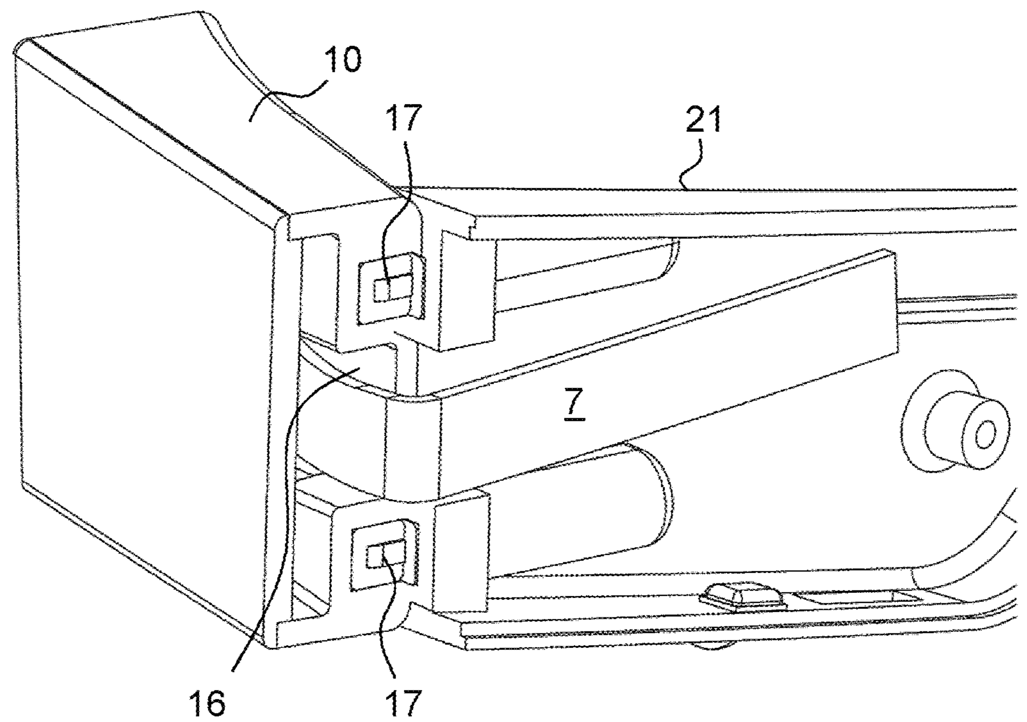
FIG. 12 shows a perspective view of a hinge side part of the eyeglass frame of FIG. 1.
Figure 13:
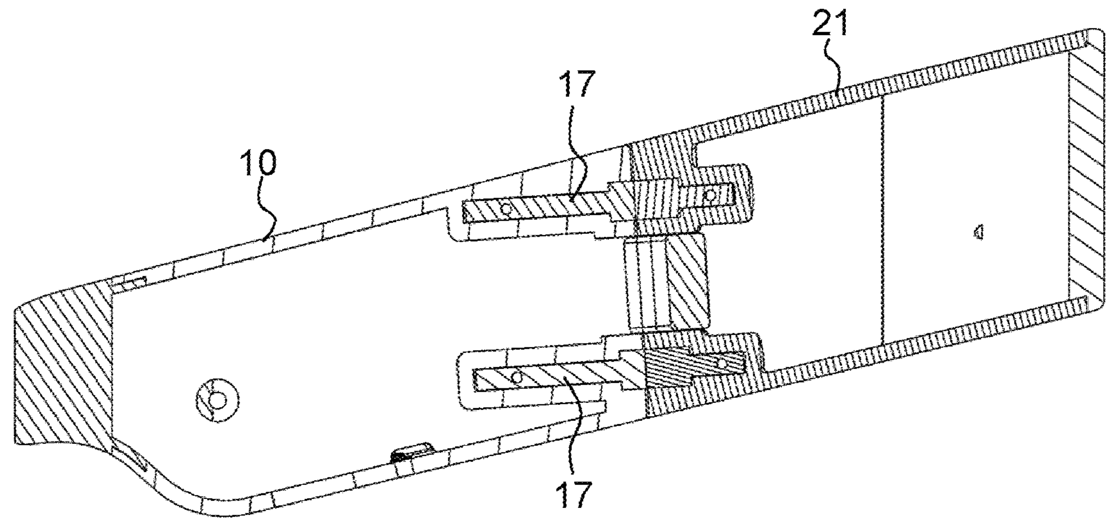
FIG. 13 shows a longitudinal section of a hinge side part of the eyeglass frame of FIG. 1.

Preferably, the eyeglass frame is foldable, wherein the temples 2, 3 of the eyeglass frame can be folded in relative to the front frame part 1. As can be seen in FIGS. 12 and 13, the front frame part 1 and the first and second temple 2, 3 are connected with hinges 17. The flexprint 7 is preferably arranged between the two hinges 17, so that it can freely move when the eyeglass frame is folded. In FIG. 13, the flexprint 7 is not visible, since it extends in a plane above the drawing. Both temples 2, 3 comprise flexprints connecting their electronic elements or their power sources to the electronic elements and, if applicable, the motor located in the front frame part 1.

Figure 14:
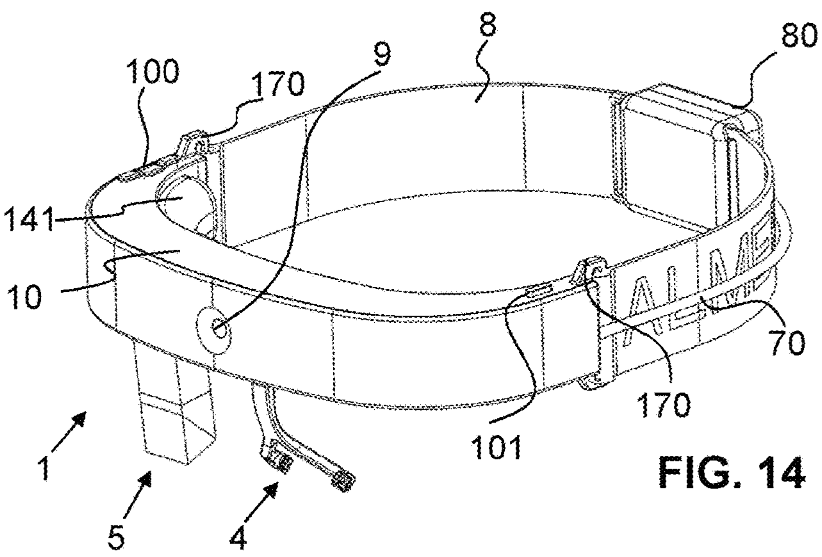
FIG. 14 shows a perspective view of AR glasses in a second embodiment according to the invention.
Figure 15:
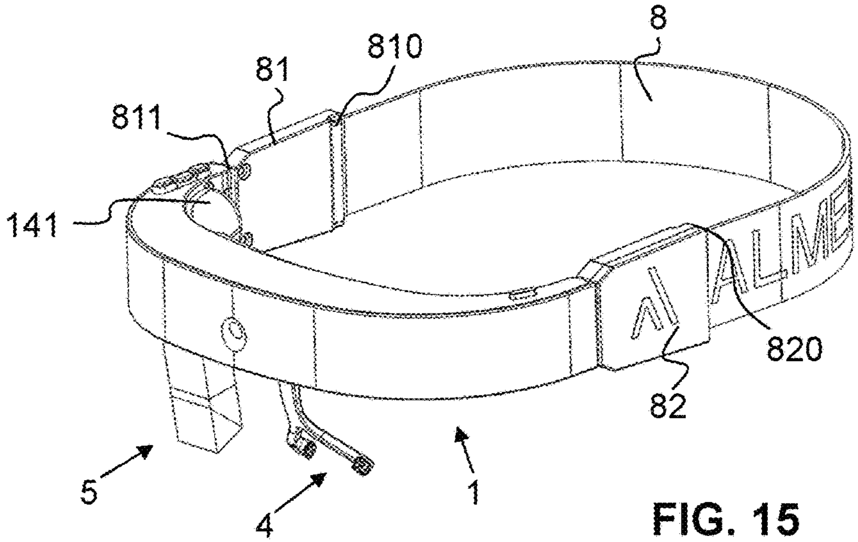
FIG. 15 shows a perspective view of AR glasses in a third embodiment according to the invention.
Figure 16:
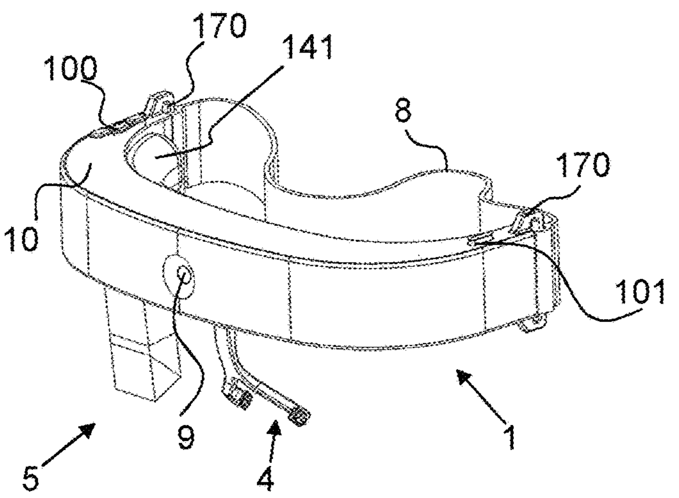
FIG. 16 shows a perspective view of AR glasses in a fourth embodiment according to the invention.

FIGS. 14 to 16 show alternative embodiments of the inventive AR glasses. Instead of stiff temples, a ribbon or band 8 is provided which can be arranged around the user's head like the band of a ski mask or of sport glasses. Preferably, the band 8 is made of a flexible, even of an elastic material, such as of a textile or a synthetic material or rubber band. In some embodiments, the band 8 is permanently connected to the front frame part 1. In other embodiments, it is releasably connected to the front frame part 1. Preferably, the band can be adjusted in its length to the user's head.

In the embodiment according to FIG. 14, brackets 170 are formed to the ends of the front frame part 1 and the band 8 is looped into the brackets 170. A power source 80, for example a battery, is arranged on the middle rear side of the AR glasses and it is supported by the band 8. Preferably, the power source 80 is arranged such that it forms a counterweight to the front main frame 1. The power source 80 is preferably slidable relative to the band 8. At least one wire 70 leads from the electronic unit arranged in the front frame part 1 to the power source 80. A cooling element is preferably arranged in the front frame part 1 as well in order to cool the electronic unit.

In the embodiment according to FIG. 15, two power sources 80, 81 are arranged on each end side of the front frame part 1, wherein they are preferably fixed to the band 8. Preferably, the band 8 is looped into brackets 810 arranged on the housings of the two power sources. The housing of one of the two power sources 81, 82 preferably comprises a plug 811 to be plugged into the front frame part 1. The housing of the other power source 81, 82 may also be provided with such a plug or it is permanently connected to the front frame part 1.

The power sources 80, 81, 82 of the embodiments according to FIGS. 14 and 15 have preferably a cuboid shape. Preferably, they are rechargeable batteries.

In the embodiment according to FIG. 16, the power source is arranged within the front frame part 1, wherein it is preferably located on the side with regard to the nose pad unit which is opposite to the optical unit 5. The band 8 is preferably looped into brackets 170 of the front frame part 1.

The band 8 as mentioned above can be used in the embodiment according to FIGS. 1 to 13 as well. In addition, the stiff temples 2, 3 as described with regard to FIGS. 1 to 13 can be used in the embodiments according to FIGS. 14 to 16 as well.

The front frame part 1 can the one as described with reference to FIGS. 1 to 13. In the embodiment according to FIGS. 14 to 21, the front frame part 1 is bended as well. Preferably, it is bended more than in the embodiment previously described. Preferably, a padding 141 is arranged on the rear of 14 the front frame part 1. The padding 141 extends almost along the whole length of the rear 14. In other embodiments, the padding 141 consists of two or more parts which are arranged along the length of the rear 14 at separated places. The padding 141 is preferably made of a soft material, such as Polyurethane foam with a layer on the top. The layer can preferably be cleaned. Preferably, it is made of a synthetic material. The padding 141 enhances the comfort to wear the glasses. In addition, the padding 141 improves the fit and it provides an isolation layer for the heat towards the head. The padding can also be used with the embodiment according to FIGS. 1 to 13 in order to provide heat isolation.

In the embodiment shown in FIGS. 14 to 21, the main front part 1 comprises actuation buttons 100 and an on/off button 101, which are preferably arranged in the top 10 of the front frame part 1.

The front frame part 1 of the embodiments according to FIGS. 14 to 16 preferably comprises a camera 9 which is preferably located in the center part of the front frame part 1. In these embodiments, the camera 9 is not covered by a one-way window. However, like it is described above, it can be arranged in the front frame part 1 in an way at least almost invisible from the outside. The camera 9 can also be arranged on a side instead being arranged in the middle region.

The nose pad unit 4 can be the same as in the embodiment according to FIGS. 1 to 13. However, it can also be a nose pad unit 4 which is not moveable. In case a ribbon or band 8 is used in combination with the front frame part 1, the adjustability of the nose pad unit 4 is not so relevant anymore.

In other embodiments having a ribbon or band 8 and especially in embodiments having a padding 141 as well, the nose pad either can be detachably removable or it is not present at all, since the glasses are fixed to the user's head by the band 8.

Figures 17, 18, 19:
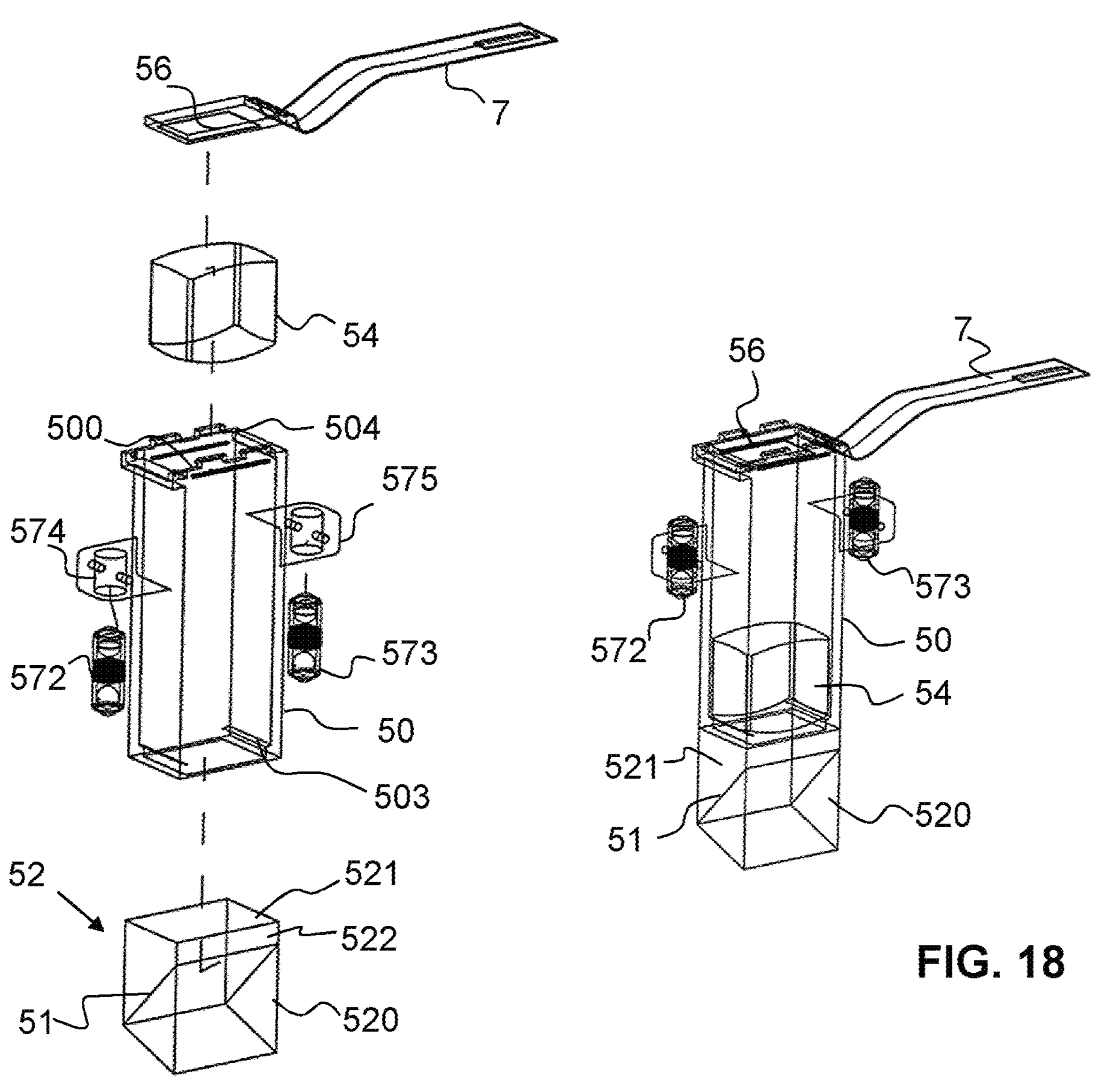
FIG. 17 shows an exploded perspective view of an optical unit of the AR glasses according to FIG. 14.
FIG. 18 shows the optical unit according to FIG. 18 in an assembled state.
FIG. 19 shows an assembled end piece forming a beamsplitter.

The optical unit 5 used in the embodiments according to FIGS. 14 to 16 can be the one described above and shown in FIGS. 1 to 13. However, the optical unit 5 is preferably made as shown in FIGS. 17 to 19. This optical unit 5 according to FIGS. 17 19 can also be used in the embodiments according to FIGS. 1 to 13.

The optical unit 5 comprises the main frame 50 which is a housing with a hollow interior. The main frame 50 is made of one piece. It is preferably made of PMMA (poly(methyl methacrylate). Alternative materials are COP (cyclo olefin polymer) or COC (cyclic olefin copolymer). The main frame 50 is preferably manufactured by injection moulding.

The main frame 50 has preferably the outer shape of a cuboid with the first opening on the top end of the main frame 50. The display source 56 connected to the flexprint 7 is closing this first opening 500. The display source 56 can be fixedly attached to the main frame 50 in any suitable way, thereby closing the first opening 500. The display source 56 is preferably a microdisplay unit of OLED's (organic light emitting diode). The display source is preferably arranged perpendicular to the longitudinal axis of the main frame 50. No mirror is therefore needed in this embodiment. The display source 56 can be glued to the main frame 50. Preferably, snapping fingers 504 are provided at the main frame 50 to hold the display source 56 in place.

The at least one refractive device, here once again the triplet lens 54, is entered into the interior space of the main frame 50 by the first opening 500. In some embodiments, this is the only opening in the main frame 50. In other embodiments, the opposite side of the main frame 50 is open as well. The lens 54 rests on rims 503 arranged on opposing side walls of the main frame 50.

The triplet lens 54 preferably consists of glass or different glasses or of another suitable material or combinations of such materials. It can also consist of a combination of glass and plastic materials. The triplet lens 54 is preferably fixed into the space of the main frame 50 by gluing. Preferably the same triplet lense is used as in the first embodiment described above.

The end piece 52 is attached to the lower end of the main frame 50. Preferably it is glued to it. An example of such an end piece, which can be used with the main frame 50 of this embodiment, is shown in FIG. 19.

This end piece 52 a whole forms the beam splitter. It consists of at least two separate components, further-on called parts 520 521. These two parts 520, 521 are fixed together. Preferably, they are glued together. They can also be combined together in another way.

The lower part 520 has the shape of a wedge, wherein the angle $\alpha$ is approximately 45° and the angle $\beta$ is different from 45°. The lower surface of this lower part 520 is therefore angled in order to remove reflections toward the user's eye on the lower surface. Preferably, the angle $\beta$ is between 59° and 66°. Preferably, it is about 62.65°. The lower part 520 is preferably transparent, wherein the lower surface of this part is preferably not polished, i.e. it is milky, to prevent reflections. The inclined surface of the lower part 520 is coated with the beam splitter coating 51.

The lower part 521 has the shape of a wedge combined with a cuboid. It has in inclined surface which fits to inclined surface of the lower part 520 which bears the beam splitter coating 51. This surface can comprise the beam splitter coating 51 as well or it can comprise this coating instead of the lower part 520.

The upper and lower parts 520, 521 can be glued together only at their edges or the beam splitter coating 51 can be provided with the glue or can partially consist of the glue.

The angle $\alpha$ of the upper part 521 is the same as in the lower part 520 and it is therefore approximately 45°. The cuboid section of the upper part 521 forms an upper front surface which, in the mounted state, extends above the lower part 520.

At least the front upper surface 522 of the upper part 521 is not polished and it is therefore milky in order to prevent top surface reflections. Preferably, the other side walls, except the upper wall and the inclined wall, are not polished and therefore milky as well. preferably, the side wall of the lower part 521 are not polished and therefore milky as well. These side walls are shown in FIG. 19 in grey. Preferably, the side walls of the upper and lower part 520, 521 are aligned with each other.

In other embodiments, the end piece 52 comprises the lower part 520 and the upper part 521, wherein they are formed such that there is not additional front upper surface 522 is present. In these or in other additional embodiments, the lower surface of the lower part may be inclined or not and it may be inclined at another angle as described above.

The end piece 52 is fixed to the lower end of the main frame 50 with the upper surface 523 of the upper part 522. It can be glued to it, for example along the edges, or it can be fixed to it with other known fixation means. Preferably, the lower side of the main frame 50 is open so that there is no material between the lens 54 and the end piece 52.

The upper and the lower parts 520, 521 are preferably made of an optical glass or an optical plastic. The main frame 50 is preferably made of none-transparent material. Preferably, it is black. In preferred embodiments, it consists of ABS (acrylonitrile butadiene styrene) or PMMA (polymethyl methacrylate).

The light beam eradiated form the display source 56 enters the optical unit 5 along the longitudinal axis of the main frame 50. The light beam enters the triplet lens 54 and it leaves the triplet lens 54 at the curved bottom side to reach the bottom of the main frame 50. There, it reaches the beamsplitter defined by the end piece 52. The beam splitter directs a first part of the light beam originally eradiated from the display source 56 to the user's eye, where the brain of the user superimposes the image shown by the display source 56 to the real-life image he sees at a distance in front of him. A second part of the light beam passes through the beamsplitter to the inclined lower surface of the lower part 520 and leaves the optical unit 5 unused. The beamsplitter coating 51 is in a typical setting chosen such that the first part is between 30-60% or about 70% of the total light incident on coating 51. The reflection/transmission ratio of the beamsplitter may be adjusted based on the brightness of the display source 56 and the ambient lightning conditions to provide a balanced AR image. In case of polarized emission from the display source 56, a polarizing beamsplitter may be used to direct nearly 100% of the emitted light to the user's eye. However, in some embodiments, no polarisation is used.

The end piece 52 comprising an upper part and a lower part fixed together comprising the beam splitter coating in-between has the advantage, that the optical unit 5 can even be assembled more easily be less trained people. The manufacturing costs of the end piece 52 and of the main frame 50 can be reduced as well.

In the upper region of the main frame 50, a first arm and a second arm 574, 575 are fixed to opposing side walls of the main frame 50. Preferably they are glued to the main frame 50. Each arm 574, 575 comprises a through opening extending in the direction of the longitudinal axis of the main frame 50. A first pin 572 extends through the opening of the first arm 574 and a second pin 573 extends through the opening of the second arm 575.

FIG. 18 shows the assembled optical unit 5 as described above. It forms a module, i.e. an independent single component, which can be handled as a whole. Especially it can be mounted as an independent single component to the eyeglass frame. It can also be moved relative to the eyeglass frame during use.

Figure 20:
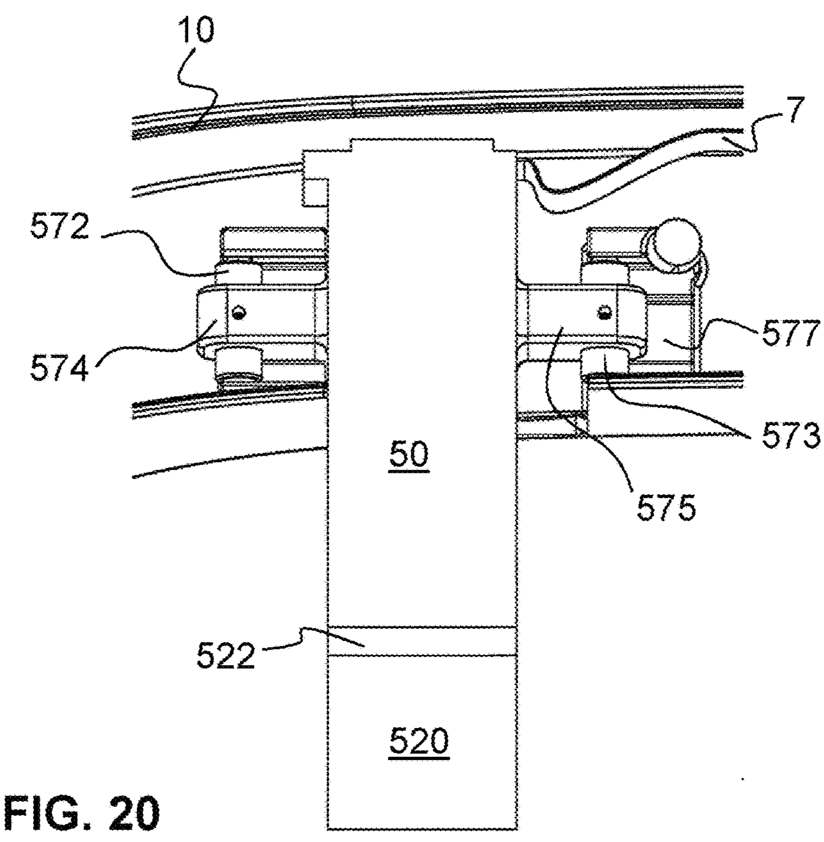
FIG. 20 shows a front view of the assembled optical unit mounted in a frame of the AR glasses according to FIG. 14, the optical unit being in a first sliding position and the frame being shown without a closing cover.
Figure 21:
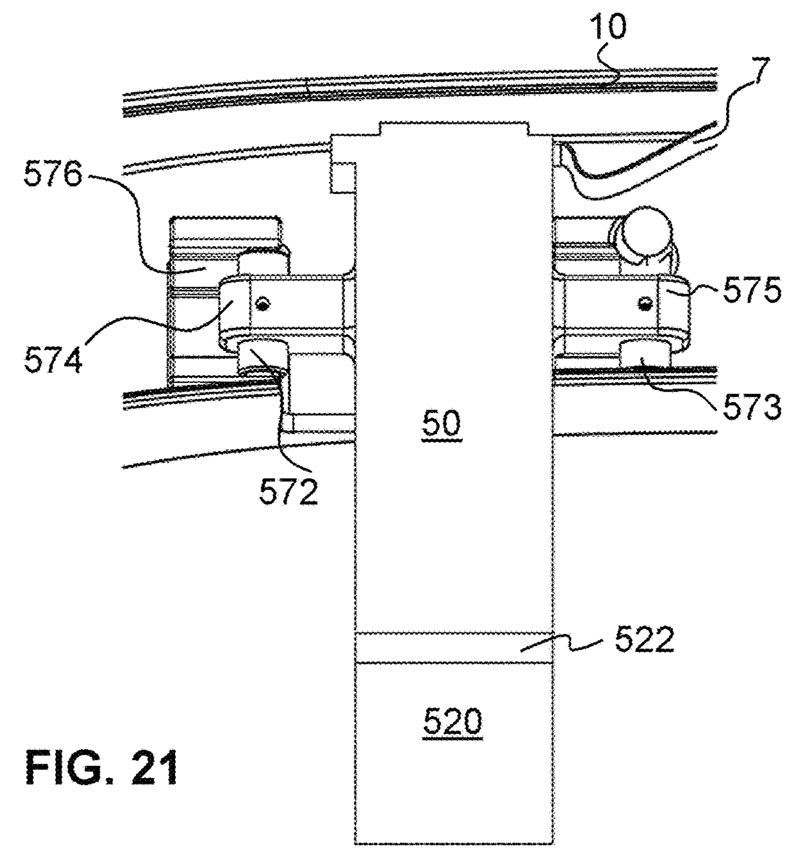
FIG. 21 shows the assembled optical unit mounted in the frame according to FIG. 20, the optical unit being in a second sliding position.

The optical unit 5 is held in the main front part of the front frame part 1, as shown in FIGS. 20 and 21. Instead of the arms 574, 575 and pins 572, 573 the optical unit 5 can comprises the mounting means as shown in FIGS. 1 to 13 and it can be movable as described above when referring to FIGS. 1 to 13. The optical unit 5 according to FIGS. 1 to 13 can also instead of having the guiding tubes 570, 571 and the protections 580, 581 comprise the arms 574, 575 and pins 572, 573 as mentioned above and it can be mounted and moved as described below when referring to the embodiment according to FIGS. 14 to 21.

As can be seen in FIGS. 20 and 21, the pins 572, 573 protrude with both ends the arms 574, 575. The pins 572, 573 are held in a first rail 576 and a second rail 577 respectively. The optical unit 5 is movable along these rails 576, 577 in a direction which extends preferably perpendicular to the direction of the longitudinal axis of the main frame 50. It is a translatory movement.

FIG. 20 shows the maximum translation of the optical unit 5 to the left hand side, FIG. 21 shows the maximum translation of the optical unit 5 to the right hand side.

The movement can be made by hand, by simply touching the optical unit 5. In other embodiments, a slide or another suitable element is present so that the optical unit 5 does not have to be touched. In another embodiment, a motor is present in the front frame part moving the optical unit 5 along the sliding axis A. The motor can be activated by the actuation buttons 100 mentioned before. The position if preferably fixed by friction. In this embodiment, the optical unit 5 is preferably not rotatable.

FIGS. 22 to 24 show an additional embodiment of the AR glasses according to the invention. In this embodiment, the camera 9 used is mounted such that it is inclined towards the bottom. Preferably, the angle is about 24°. The use therefore sees more of the environment below his head than above his head. This increases his visual field with regard to his working place. In addition or alternatively, the optical unit 5 is arranged at an angle as well. Preferably, the angle $\gamma$ between the rear side of the optical unit 5 and the bottom of the front frame part 1 is about 81° to 79° and the angle $\lambda$ between the front side of the optical unit 5 and the bottom 13 of the front frame part 1 is about 9° to 11°. The angle is most preferably about 81° and 9°.

These angled arrangements of the camera 9 and the optical unit 5 can together or each of them taken alone be realized in other embodiments of the invention as well. Especially, they can be used in the embodiments mentioned above as well.

The AR glasses can be used as shown in the figures without additional spectacle lenses. Alternatively spectacle lenses can be fixed to the spectacle frame as well. This allows the combination of the AR functions with prescription glasses and/or with protection glasses.

The AR glasses according to the invention, especially the embodiments according to FIGS. to 24, can be produced at a minimum of costs, due to the minimum of components, the simple shape of components and the simplified assembly.

The AR glasses according to the invention are robust, comfortable to wear, compact and affordable.

LIST OF REFERENCE SIGNS

| | | | |
|---|---|---|---|
| 1 | front frame part | 410 | adjustment legs |
| 10 | top | 42 | nose pad |
| 100 | actuation buttom | | |
| 101 | on/off buttom | 5 | optical unit |
| 11 | main front | 50 | main frame |
| 12 | side front | 500 | first opening |

-continued

LIST OF REFERENCE SIGNS

| | | | |
|---|---|---|---|
| 13 | bottom | 501 | second opening |
| 14 | rear | 502 | third opening |
| 140 | window | 503 | rim |
| 141 | padding | 504 | snapping fingers |
| 15 | adjustment unit | 51 | beam splitter coating |
| 151 | rack | 52 | end piece |
| 152 | slide | 520 | lower part |
| 16 | spacing | 521 | upper part |
| 17 | hinge | 522 | upper front surface |
| 170 | bracket | 523 | upper surface of upper part |
| 18 | holder | 53 | mirror |
| 180 | shaft | 54 | triplet lens |
| 181 | O-ring | 55 | cover |
| 19 | duct | 56 | display source |
| | | 570 | first guiding tube |
| 2 | first eyeglass temple | 571 | second guiding tube |
| 20 | first thickened end | 572 | first pin |
| 21 | first temple arm | 573 | second pin |
| 22 | first arch | 574 | first arm |
| | | 575 | second arm |
| 3 | second eyeglass temple | 576 | first rail |
| 30 | second thickened end | 577 | second rail |
| 31 | second temple arm | 580 | first protection |
| 310 | touch panel | 581 | second protection |
| 32 | second arch | | |
| | | 6 | port |
| 4 | nose pad unit | | |
| 41 | nose bridge | 7 | flexprint |
| 70 | wire | | |
| | | L | central axis |
| 8 | band | A | sliding axis |
| 80, 81, 82 | power source | B | rotation axis |
| 810 | bracket | $\alpha$ | angle |
| 811 | first plug | $\beta$ | angle |
| 9 | camera | | |

The invention claimed is:

1. An AR headset comprising a headset frame with a front frame part, mounting means and an optical unit, wherein the optical unit is held in the front frame part and arranged within the front frame part and protruding downward from the front frame part, wherein the optical unit forms a module mountable to the headset frame as a single component, wherein the optical unit comprises at least a display source, at least one refractive device and a beamsplitter;

wherein the display source is located within the front frame part, wherein the at least one refractive device is located further down than the display source, and wherein the beamsplitter is located further down than the at least one refractive device, a light beam eradiated from the display source passing through the at least one refractive device before reaching the beamsplitter.

2. The AR headset according to claim 1 wherein the at least one refractive device is a triplet lens.

3. The AR headset according to claim 1 wherein the optical unit comprises a main frame.

4. The AR headset according to claim 3, wherein the main frame is not transparent for visible light.

5. The AR headset according to claim 3 wherein at least one of the following optical elements is/are arranged within the main frame or protrudes from the main frame: the display source, the at least one refractive device and the beamsplitter.

6. The AR headset according to claim 3 wherein the optical unit comprises a mirror and wherein the mirror is arranged within the main frame.

7. The AR headset according to claim 5 wherein the main frame is formed by a closed hollow body with an opening closed by the display source.

8. The AR headset according to claim 7 wherein the main frame comprises additional openings closed by at least one cover closing an opening leading to the at least one refractive device and, if present, by the mirror.

9. The AR headset according to claim 3 wherein the main frame is made of poly(methyl methacrylate), called PMMA (polymethyl methacrylate), ABS (acrylonitrile butadiene styrene), or of cyclo olefin polymer, called COP, or of cyclic olefin copolymer, called COC.

10. The AR headset according to claim 3 wherein the main frame comprises a bottom end and wherein an end piece is attached to this bottom end, the end piece or the end piece together with the bottom end forming the beam splitter.

11. The AR headset according to claim 10 wherein the end piece is made of poly(methyl methacrylate), called PMMA, or of cyclo olefin polymer, called COP, or of cyclic olefin copolymer, called COC.

12. The AR headset according to claim 10 wherein the bottom end of the main frame is inclined.

13. The AR headset according to claim 10 wherein the end piece is made of an optical glass or an optical material.

14. The AR headset according to claim 10 wherein the end piece comprises a lower part and an upper part which are separate components fixed to each other, wherein a beam splitter coating is arranged in a region between the lower part and the upper part.

15. The AR headset according to claim 10, wherein the end piece comprises none-polished side walls.

16. The AR headset according to claim 1 wherein the optical unit is movable held within the front frame part, wherein the optical unit is slidable and/or rotatable relative to the front frame part.

17. The AR headset according to claim 1 the headset frame comprises a nose pad unit, wherein the nose pad unit is movable relative to the front frame part in order to adjust the position of the headset frame on a nose of a user.

18. The AR headset according to claim 1 wherein the AR headset comprise an electronic unit, which is arranged within the front frame part of the headset frame.

19. The AR headset according to claim 18 wherein front frame part comprise a cooling element arranged in the region of the electronic unit.

20. The AR headset according to claim 1 wherein the mounting means are a first eyeglass temple and a second eyeglass temple.

21. The AR headset according to claim 20 wherein the first eyeglass temple and the second eyeglass temple are movable relative to the front frame part so that the headset frame is foldable.

22. The AR headset according to claim 21 wherein the headset frame comprises two hinges being arranged one above the other and connecting the first or second eyeglass temple with the front frame part, thereby forming a gap between each other, wherein a flexprint is arranged within the headset frame leading from the first eyeglass temple or from the second eyeglass temple to the front frame part and wherein the flexprint is arranged in the gap between the two hinges leaving the hinges free.

23. The AR headset according to claim 1 wherein the mounting means is a band.

24. The AR headset according to claim 23 wherein the AR headset comprises at least one power source and wherein the at least one power source is arranged a) between the front frame part and the band or b) within the front frame part or c) on the band.

25. The AR headset according to claim 1 wherein a padding is arranged on a rear side of the main front part facing the user's forehead.

26. The AR headset according to claim 1, comprising a camera being inclined towards a bottom.

27. The AR headset according to claim 1, wherein the optical unit is inclined compared to a bottom of the front frame part.

28. The AR headset according to claim 27, wherein the optical unit is inclined in an angle between the rear side of the optical unit and the bottom of the front frame part of about 81° to 79°.

29. The AR headset according to claim 27, wherein the optical unit is inclined in an angle between the rear side of the optical unit and the bottom of the front frame part of about 81°.

30. The AR headset according to claim 3 wherein the display source, the at least one refractive device and the beamsplitter are arranged within the main frame or protrude from the main frame.

31. An AR headset comprising a frame with a front frame part, mounting means and an optical unit, wherein the optical unit is held in the front frame part and arranged within the front frame part and protruding downward from the front frame part, wherein the optical unit forms a module mountable to the headset frame as a single component, wherein the optical unit comprises at least a display source, at least one refractive device and a beamsplitter, wherein the optical unit comprises a main frame, and wherein the main frame comprises a bottom end and wherein an end piece is attached to this bottom end, the end piece or the end piece together with the bottom end forming the beam splitter.

* * * * *